(12) United States Patent
Liu et al.

(10) Patent No.: US 7,567,782 B2
(45) Date of Patent: Jul. 28, 2009

(54) RE-CONFIGURABLE IMPEDANCE MATCHING AND HARMONIC FILTER SYSTEM

(75) Inventors: Lianjun Liu, Chandler, AZ (US); Melvy F. Miller, Tempe, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 320 days.

(21) Appl. No.: 11/494,821

(22) Filed: Jul. 28, 2006

(65) Prior Publication Data

US 2008/0026709 A1 Jan. 31, 2008

(51) Int. Cl.
*H04B 1/04* (2006.01)

(52) U.S. Cl. .................. 455/121; 455/129; 455/102; 455/114.1

(58) Field of Classification Search .................. 455/121, 455/129, 102, 114.1; 375/60, 39, 347
See application file for complete search history.

(56) References Cited

U.S. PATENT DOCUMENTS

| | | | |
|---|---|---|---|
| 5,371,481 A * | 12/1994 | Tiittanen et al. | 332/103 |
| 5,513,222 A | 4/1996 | Jwasaki | |
| 6,243,566 B1 * | 6/2001 | Peckham et al. | 455/127.4 |
| 6,307,169 B1 | 10/2001 | Sun | |
| 6,307,452 B1 | 10/2001 | Sun | |
| 6,384,353 B1 | 5/2002 | Huang | |
| 6,507,475 B1 | 1/2003 | Sun | |
| 6,706,548 B2 | 3/2004 | Liu | |
| 6,794,101 B2 | 9/2004 | Liu | |
| 2005/0221765 A1 | 10/2005 | Shen et al. | |

OTHER PUBLICATIONS

De Graauw, A.J.M. et al. RF-MEMS for single Line-Up Front-End Modules, Phillips Semiconductors, Nijmegen, Jun. 2005.
Fukuda, Atsushi, et al/NTT DoCoMo Inc., "Novel 900 MHz/1.9 GHz Dual-Mode Power Amplifier Employing MEMS Switches for Optimum Matching". IEEE Microwave and Wireless Component Letters, vol. 14, No. 3, 2004, pp. 121-123.
PCT/US07/67257 International Search Report and Written Opinion.

* cited by examiner

*Primary Examiner*—Sanh D Phu
(74) *Attorney, Agent, or Firm*—Ingrassia, Fisher & Lorenz, P.C.

(57) ABSTRACT

Methods and apparatus are provided to enable a transceiver (200) or transmitter including a single PA line-up (210) to transmit signals having frequencies in two or more different frequency bands, and/or having two or more different modulation types, and/or having two or more different RF power levels. The single PA line-up includes at least one variable matching circuit (216) and a variable harmonic filter (240) to tune match and tune filter communication signals prior to transmission. The variable matching circuit and the variable harmonic filter each include at least one variable capacitive element (2160 and 2400) that switches ON/OFF depending on whether a low frequency signal or a high frequency signal is being transmitted. Each variable capacitive element includes separate direct current and radio frequency terminals to enable the single PA line-up to change signal modulation and/or RF power levels in addition to frequencies.

20 Claims, 3 Drawing Sheets

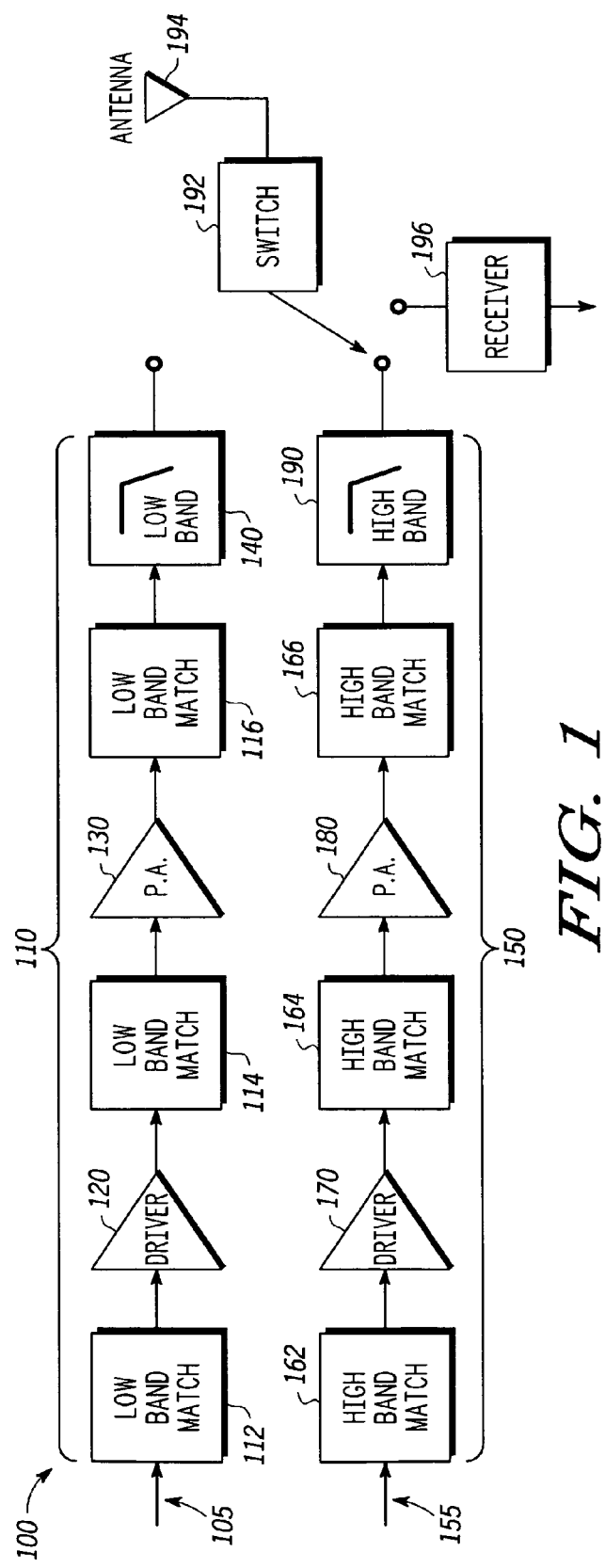
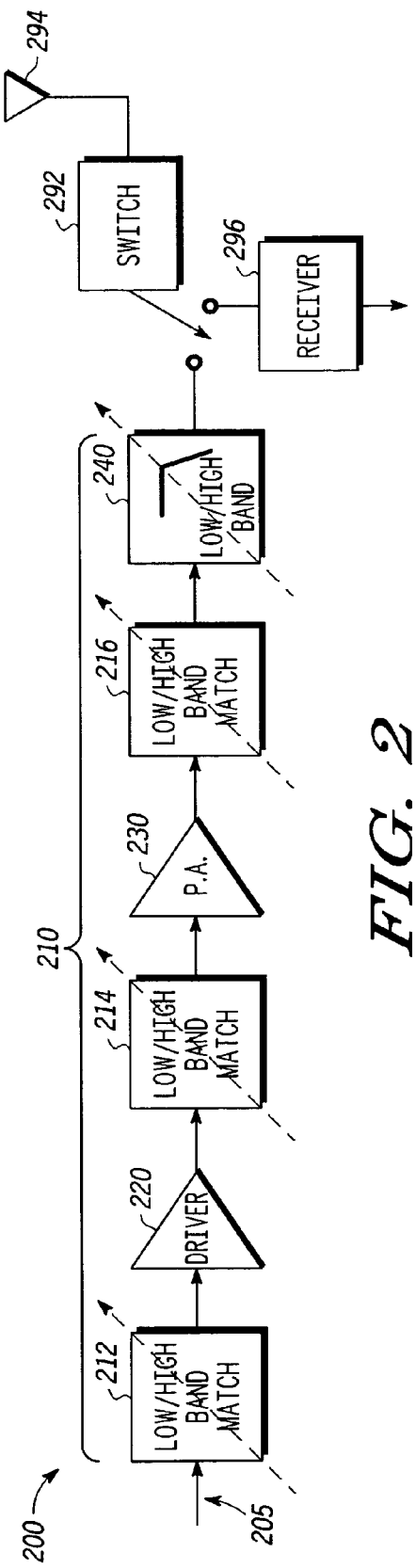
FIG. 1 —PRIOR ART—
FIG. 2

RE-CONFIGURABLE IMPEDANCE MATCHING AND HARMONIC FILTER SYSTEM

FIELD OF THE INVENTION

The present invention generally relates to communication devices, and more particularly relates to power amplifier line-ups in transceivers and transmitters.

BACKGROUND OF THE INVENTION

Many cellular telephones with, for example, a Global System for Mobile communications (GSM) modulation utilize two frequency bands: 824 MHz to 915 MHz and 1710 MHz to 1910 MHz. To utilize both frequency bands, cellular telephones include multiple power amplifier (PA) line-ups in typical radio frequency front-end modules. In GSM cellular telephones, there are typically two PA line-ups: one line-up for low frequency band signals (e.g., 824 megahertz (MHz) to 915 MHz), and one line-up for high frequency band signals (e.g., 1710 MHz to 1910 MHz).

Separate line-ups for low frequency band signals and high frequency band signals is desirable because of the significant difference in the impedance matching networks and harmonic filter systems needed for each signal band. In other words, the PA output impedance matching network for low frequency band signals does not work well in matching a high frequency band PA to antenna switch impedances. If a typical single PA line-up is utilized for both frequency bands, an optimized low frequency signal band matching network will create significant mismatch for high frequency signal band operations and consequently, too high of an insertion loss. Moreover, the harmonic filter circuit for low frequency band signals is not desirable for high frequency band signals because a low frequency band harmonic filter would almost completely reject the high frequency band transmitting signal. Accordingly, current cellular telephones have a system utilizing two or more PA line-ups, which increases the cost and size of the cellular telephone.

Accordingly, it is desirable to provide methods and apparatus to enable the combination of two or more frequency bands into a single PA line-up. In addition, it is desirable to utilize such apparatus and methods to reduce the overall product size and cost of a communication device. Furthermore, other desirable features and characteristics will become apparent from the subsequent detailed description of the invention and the appended claims, taken in conjunction with the accompanying drawings and this background of the invention.

BRIEF DESCRIPTION OF THE DRAWINGS

The various embodiments will hereinafter be described in conjunction with the following drawing figures, wherein like numerals denote like elements, and FIG. 1 is a diagram of a prior art transceiver having a dual power amplifier (PA) line-up;

FIG. 2 is a diagram of one embodiment of a transceiver including a single PA line-up;

DETAILED DESCRIPTION OF THE INVENTION

Figure 3:
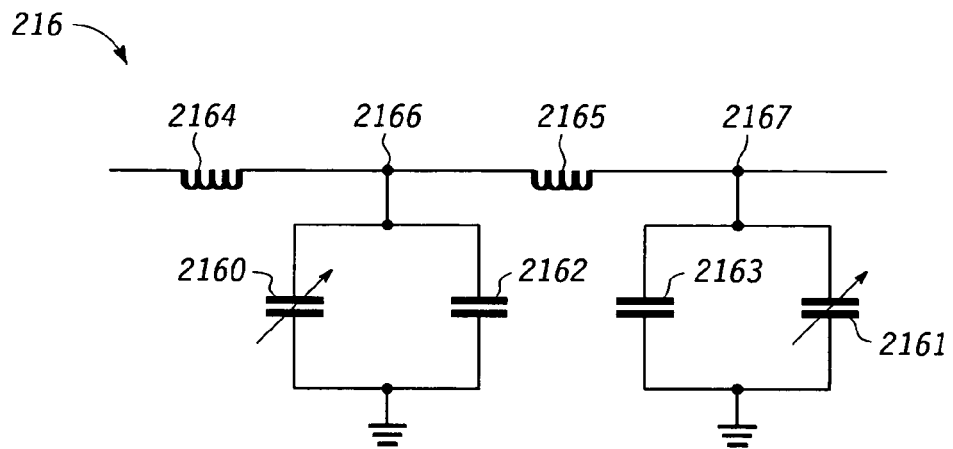
FIG. 3 is a schematic of an embodiment a variable matching circuit included in the single PA line-up of FIG. 2.

The following detailed description is merely illustrative in nature and is not intended to limit the scope or application of possible embodiments. Furthermore, there is no intention to be bound by any expressed or implied theory presented in the preceding technical field, background, brief summary, or the following detailed description.

Various embodiments may be described herein in terms of functional and/or logical block networks and various processing steps. It should be appreciated that such block networks may be realized by any number of hardware, software, and/or firmware networks configured to perform the specified functions. For the sake of brevity, conventional techniques and systems related to semiconductor processing, packaging, and semiconductor devices are not treated in exhaustive detail herein.

As discussed above, conventional communication devices (e.g., cellular telephones) are unsatisfactory in a number of respects. With reference to FIG. 1, for example, a prior art transceiver 100 includes a transmitter having a low frequency power amplifier (PA) line-up 110 for transmitting low frequency signals (e.g., signals having a frequency of 824 MHz to 915 MHz) and a high frequency PA line-up 150 for transmitting high frequency signals (e.g., signals having a frequency of 1710 MHz to 1910 MHz).

Low frequency PA line-up 110 includes multiple low band matching circuits (e.g., low band matching circuit 112, low band matching circuit 114, and low band matching circuit 116) coupled between various system components (e.g., a driver 120, a PA 130, and a low band filter 140, each of which is discussed below). In the example shown in FIG. 1, low band matching circuit 112 is coupled to a signal generator (not shown) and an input of driver 120, and is configured to receive low frequency signals 105 from the signal generator. Low band matching circuit 114 is coupled to an output of driver 120 and coupled to an input of PA 130, and low band matching circuit 116 is coupled to an output of PA 130 and coupled to an input of low band filter 140.

Similarly, high frequency PA line-up 150 also includes multiple high band matching circuits (e.g., high band matching circuit 162, high band matching circuit 164, and high band matching circuit 166) coupled between various system components (e.g., a driver 170, a PA 180, and a high band filter 190, each of which is discussed below). As illustrated in FIG. 1, high band matching circuit 162 is coupled to the signal generator and an input of driver 170, and is configured to receive high frequency signals 155 from the signal generator. High band matching circuit 164 is coupled to an output of driver 170 and coupled to an input of PA 180, and high band matching circuit 166 is coupled to an output of PA 180 and coupled to an input of high band filter 190.

In addition, transceiver 100 includes a switch 192 coupled to an antenna 194, wherein antenna 194 typically includes an impedance requirement for transmitting signals. Furthermore, switch 192 is configured to switch between low frequency PA line-up 110, high frequency PA line-up 150, and a receiver 196.

In operation, when transceiver 100 receives a signal (not shown) from, for example, a telecommunications base station (not shown), the signal carrier instructs transceiver 100 which bandwidth (i.e., 824 MHz to 915 MHz or 1710 MHz to 1910 MHz) to utilize when transmitting an output signal. Once transceiver 100 receives this instruction, transceiver 100 will utilize switch 192 to appropriately choose either low frequency PA line-up 110 or high frequency PA line-up 150 depending on whether a low frequency signal 105 or a high frequency signal 155 is to be utilized.

FIG. 2 is a diagram illustrating one embodiment of a transceiver 200 having a transmitter that includes a single low/high frequency PA line-up 210 to transmit signals 205 having frequencies in a plurality of frequency bands. Low/high frequency PA line-up 210, in accordance with one embodiment, includes a plurality of matching circuits (e.g., matching circuit 212, matching circuit 214, and matching circuit 216) coupled to various system components (e.g., driver 220, PA 230, and low/high band filter 240, each of which is discussed below). In the embodiment illustrated in FIG. 2, matching circuit 212 is coupled to an input of a driver 220, matching circuit 214 is coupled to an output of driver 220 and coupled to an input of a PA 230, and matching circuit 216 is coupled to an output of PA 230 and coupled to an input of a low/high band filter 240, wherein driver 220 and PA 230 may be any driver or PA, respectively, known in the art or developed in the future capable of amplifying communication signals having low or high frequencies. Furthermore, driver 220 and PA 230 are each suitably configured to amplify signals 205 to any desired level. Moreover, driver 220 and PA 230 are each suitably configured to operate at a large enough bandwidth to include substantially all of the frequencies in each of the plurality of bandwidths transmitted by transceiver 200.

Matching circuits 212, 214, and 216, in one embodiment, are each variably configurable to match the impedance of signals 205 between the input and output of their respective system components in transceiver 200. In accordance with one embodiment, matching circuits 212, 214, and 216 are each configurable to variably match the impedance of the system components with which they are respectively coupled between such that low/high frequency PA line-up 210 is capable of transmitting signals having frequencies in more than one frequency band. The signals 205 transmitted by low/high frequency PA line-up 210, in one embodiment; include frequencies in a low frequency band (e.g., 824 MHz to 915 MHz) and signals in a high frequency band (e.g., 1710 MHz to 1910 MHz). In addition, low/high frequency PA line-up 210 is configurable such that low/high frequency PA line-up 210 is able to match the impedance between system components for signals having frequencies in N number of frequency bands, where N is an integer greater than zero.

In accordance with another embodiment, matching circuits 212, 214, and 216 are variably configurable to enable proper impedance matching for low/high frequency PA line-up 210 such that signals 205 having a plurality of modulation types may be transmitted. For example, low/high frequency PA line-up 210 may be configurable for operating with GSM, Enhanced Data rates for GSM Evolution (EDGE), or Code Division Multiple Access (CDMA) modulations.

In yet another embodiment, matching circuits 212, 214, and 216 are variably configurable to enable proper impedance matching for low/high PA line-up 210 for transmitting signals 205 having a plurality of RF power levels. For example, low/high frequency PA line-up 210 may be configurable to transmit signals 205 having power in the range of about 1 milliwatts to about 3 Watts.

Notably, although matching circuits 212 and 214 are described above as being variably configurable, one embodiment contemplates that only matching circuit 216 is a variable matching circuit and neither matching circuit 212 nor matching circuit 214 are variable matching circuits. In another embodiment, matching circuit 216 and matching circuit 214 are variable matching circuits, and matching circuit 212 is not a variable matching circuit. In yet another embodiment, matching circuit 216 and matching circuit 212 are variable matching circuits, and matching circuit 214 is not a variable matching circuit. Accordingly, when matching circuit 212 and/or 214 are not variable matching circuits, these circuits do not include variable capacitive elements.

Low/high band filter 240 is configurable to allow desired frequencies to pass through it. In accordance with one embodiment, low/high band filter 240 is a configurable bandpass filter capable of allowing signals 205 in a plurality of frequency bands and modulation types to pass through it. Low/high band filter 240, in one embodiment, is configurable to allow signals 205 having frequencies in a low frequency band or signals 205 having frequencies in a high frequency band to pass through low/high band filter 240, depending upon which frequency with which transceiver 200 is transmitting signals.

In accordance with one embodiment, low/high band filter 240 is configurable to allow signals 205 having a frequency of, for example, 824 MHz to 915 MHz and 1710 MHz to 1910 MHz to pass through it. For example, signals 205 are low frequency signals, low/high band filter 240 will filter out the harmonic signals of the fundamental frequencies of 824 MHz to 915 MHz. Similarly, when signals 205 are high frequency signals, low/high band filter 240 will filter out the harmonic signals of the fundamental frequencies of 1710 MHz to 1910 MHz. Accordingly, low/high PA line-up 210 is capable of tune-matching (via variable matching circuits 212, 214, and 216) a plurality of system components and tune-filtering (via low/high band filter 240) signals 205 having frequencies in multiple frequency bands, multiple modulation types, and/or multiple levels of power.

In another embodiment, low/high band filter 240 is configurable to allow a plurality of signal modulation types to pass through. Low/high band filter 240, in one embodiment, is configurable to allow signals having GSM, EDGE, or CDMA modulations to pass through.

Transceiver 200 also includes a switch 292 to switch between low/high PA line-up 210 and a receiver 296, wherein switch 292 may be any switch known in the art or developed in the future and receiver 296 may be any receiver known in the art or developed in the future. In addition, although receiver 296 is illustrated as having only one receiving path, receiver 296 may include any number of receiving paths to receive signals having frequencies in a plurality of frequency bands.

Furthermore, switch 292 is coupled to an antenna 294, wherein antenna 294 may be any antenna known in the art or developed in the future. In accordance with one embodiment, antenna 294 includes an impedance requirement of about 50Ω. However, antenna 294 may require any amount of impedance.

Accordingly, the various system components of low/high frequency PA line-up 210 are each individually and/or collectively configurable to match the overall impedance of PA line-up 210 to the impedance required by antenna 294. Moreover, in accomplishing the impedance requirement, each of variable matching circuits 212, 214, and 216 are configurable to match the impedance of signals 205 to the inputs and outputs of the system components with which they are respectively coupled between for both low frequency signals and high frequency signals.

In operation, low/high frequency PA line-up 210 is capable of transmitting signals 205 having different frequencies and/or modulations and/or RF power levels. Accordingly, low/high frequency PA line-up 210 is capable of transmitting signals 205 having a frequency in the same frequency band (e.g., 824 MHz to 915 MHz or 1710 MHZ to 1910 MHz), but having different modulation types (e.g., GSM vs. EDGE, GSM vs. CDMA, or EDGE vs. CDMA) and different RF power (e.g., 1 Watt vs. 3 Watts, 0.5 Watts vs. 1 milliwatts, etc.); signals 205 having the same signal modulation type (e.g., CDMA), but having frequencies in different frequency bands and different RF power; signals 205 having the same RF power, but having frequencies in different frequency bands and having different modulation types; signals 205 having frequencies in the same frequency band and having the same modulation type, but having different RF power; signals 205 having frequencies in the same frequency band and having the same RF power, but having different modulation types; signals 205 having the same modulation type and the same RF power, but having frequencies in different frequency bands; and signals 205 having frequencies in different frequency bands, having different modulation types, and different RF power. In other words, low/high frequency PA line-up 210 is capable of transmitting signals 205 having any combination of frequencies in a plurality of frequency bands, modulation types, and RF power levels.

Notably, although low/high PA line-up 210 is described as being within transceiver 200, low/high PA line-up 210 may also form a portion of a transmitter. Accordingly, the present disclosure is not limited to transceivers, but also includes any device capable of transmitting signals.

FIG. 3 is a schematic of one embodiment of variable matching circuit 216. In illustrated embodiment, variable matching circuit 216 includes a variable capacitive element 2160, a variable capacitive element 2161, a capacitive element 2162, a capacitive element 2163, an inductive element 2164, and an inductive element 2165.

Variable capacitive elements 2160 and 2161 may each be any device capable of variably storing charge for a given electric potential. In addition, capacitive elements 2160 and 2161 may each be any variable capacitor or variable capacitive element known in the art or developed in the future. In accordance with one embodiment, variable capacitive elements 2160 and 2161 are each micro-electro-mechanical systems (MEMS) capacitive elements. In another embodiment, capacitive elements 2160 and 2161 are variable capacitive elements. In yet another embodiment, variable capacitive elements 2160 and 2161 are each MEMS variable capacitive elements with separate direct current and radio frequency terminals. In still another embodiment, variable capacitive elements 2160 and 2161 are each tunable MEMS variable capacitive elements with separate direct current and radio frequency terminals. In still another embodiment, variable capacitive elements 2160 and 2161 are each binary MEMS variable capacitive elements with separate DC and RF terminals.

In accordance with one embodiment, capacitive elements 2160 and 2161 are each capacitive elements in the range of about 0.5 picofarads (pF) to about 30 pF and capable of being switched ON/OFF. Including separate DC terminals in capacitive elements 2160 and 2161, in various embodiments, enables variable matching circuit 216 to realize proper re-configuration without introducing coupling between DC and RF signals.

In accordance with one embodiment, capacitive elements 2162 and 2163 are each capacitive elements in the range of about 0.5 pF to about 30 pF. Accordingly, capacitive elements 2162 and 2163 may be any capacitive element know in the art or developed in the future. Similarly, in accordance with another embodiment, inductive elements 2164 and 2165 are each inductive elements in the range of about 0.2 nanohenries (nH) to about 10 nH. As such, inductive elements 2164 and 2165 may be any inductive element known in the art or developed in the future.

In the embodiment illustrated in FIG. 3, variable capacitive element 2160 is coupled in parallel with capacitive element 2162, and variable capacitive element 2160 and capacitive element 2162 are coupled to inductive element 2164 via a node 2166. In addition, inductive element 2165 is coupled to node 2166 and coupled to variable capacitive element 2161 and capacitive element 2163 via a node 2167, wherein variable capacitive element 2161 and capacitive element 2163 are coupled in parallel with each other. Notably, variable matching circuit 216 is illustrated with two variable capacitive elements, two capacitive elements, and two inductive elements, however, various embodiments contemplate the use of any number of variable capacitive elements, capacitive elements, and inductive elements to realize the re-configuration of PA 230 output matching for operation in different frequency bands.

In operation, a controller (not shown) switches ON variable capacitive elements 2160 and 2161 to properly match variable matching circuit 216 to PA 230 and low/high band filter 240 when transceiver 200 is transmitting a low frequency signal. Moreover, the controller switches OFF variable capacitive elements 2160 and 2161 to properly match variable matching circuit 216 to PA 230 and low/high band filter 240 when transceiver 200 is transmitting a high frequency signal. Accordingly, variable matching circuit 216 is capable of impedance matching for at least two frequency bands, and/or for at least two signal modulation types, and/or for at least two power levels.

Notably, although the above discussion has been described with reference to variable matching circuit 216, variable matching circuits 212 and 214 are configured to operate in a manner similar to variable matching circuit 216 to match the system components with which they are respectively coupled between.

Figure 4:
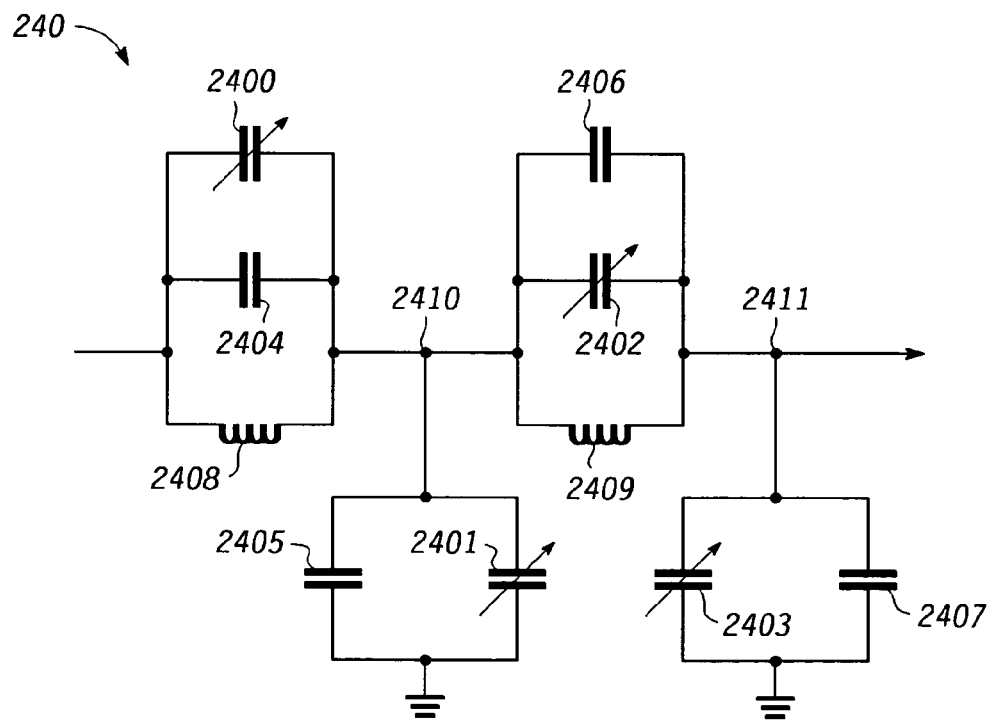
FIG. 4 is a schematic of one embodiment of a variable filter included in the single PA line-up of FIG. 2.

FIG. 4 is a schematic of one embodiment of low/high band filter 240. In the embodiment illustrated in FIG. 4, low/high band filter 240 is a variable harmonic filter including four variable capacitive elements 2400-2403, four capacitive elements 2404-2407, and two inductive elements 2408-2409.

Variable capacitive elements 2400-2403 may each be any device capable of variably storing charge for a given electric potential. In addition, capacitive elements 2400-2403 may each be any variable capacitor or variable capacitive element known in the art or developed in the future. In accordance with one embodiment, variable capacitive elements 2400-2403 are each MEMS variable capacitive elements. In another embodiment, variable capacitive elements 2400-2403 are each MEMS variable capacitive elements with separate direct current and radio frequency terminals. In yet another embodiment, variable capacitive elements 2400-2403 are each tunable MEMS variable capacitive elements with separate direct current and radio frequency terminals. In still another embodiment, variable capacitive elements 2400-2403 are each binary MEMS variable capacitive elements with separate DC and RF terminals.

In accordance with one embodiment, capacitive elements 2400-2403 are each capacitive elements in the range of about 0.5 pF to about 30 pF and capable of being switched ON/OFF. Including separate DC terminals in capacitive elements 2400-2403 in various embodiments enables low/high band filter 240 to properly switch state without introducing coupling between DC and RF signals.

Capacitive elements 2404-2407 may be any capacitor or capacitive element know in the art or developed in the future. In accordance with one embodiment, capacitive elements 2404-2407 are each capacitive elements in the range of about 0.2 pF to about 10 pF. Similarly, inductive elements 2408 and 2409 may be any inductor or inductive element known in the art or developed in the future. In accordance with one embodiment, inductive elements 2408 and 2409 are each inductive elements in the range of about 1.0 nH to about 10 nH.

In the embodiment illustrated in FIG. 4, variable capacitive element 2400 is coupled in parallel with capacitive element 2404 and inductive element 2408. In addition, variable capacitive element 2401 is coupled in parallel with capacitive element 2405, and variable capacitive element 2401 and capacitive element 2405 are coupled to variable capacitive element 2400, capacitive element 2404, and inductive element 2408 via a node 2410. Furthermore, variable capacitive element 2402 is coupled in parallel with capacitive element 2406 and inductive element 2409, and coupled to variable capacitive element 2401 and capacitive element 2405 via node 2410. Moreover, variable capacitive element 2403 is coupled in parallel with capacitive element 2407, and coupled to variable capacitive element 2402, capacitive element 2406, and inductive element 2409 via a node 2411.

Notably, low/high band filter 240 is illustrated with four variable capacitive elements, four capacitive elements, and two inductive elements, however, various embodiments contemplate the use of any number of variable capacitive elements, capacitive elements, and inductive elements to filter out signals having unwanted frequencies (i.e., signals having frequencies outside the desired transmitted frequency band).

In operation, a controller (not shown) switches OFF variable capacitive elements 2400-2403 to filter out harmonics of the high band fundamental frequency signal. Moreover, the controller switches ON variable capacitive elements 2400-2403 to filter out harmonics of the low band fundamental frequency signal. Accordingly, low/high band filter 240 is capable of allowing signals having frequencies in more than one frequency band to pass through it.

Figure 5:
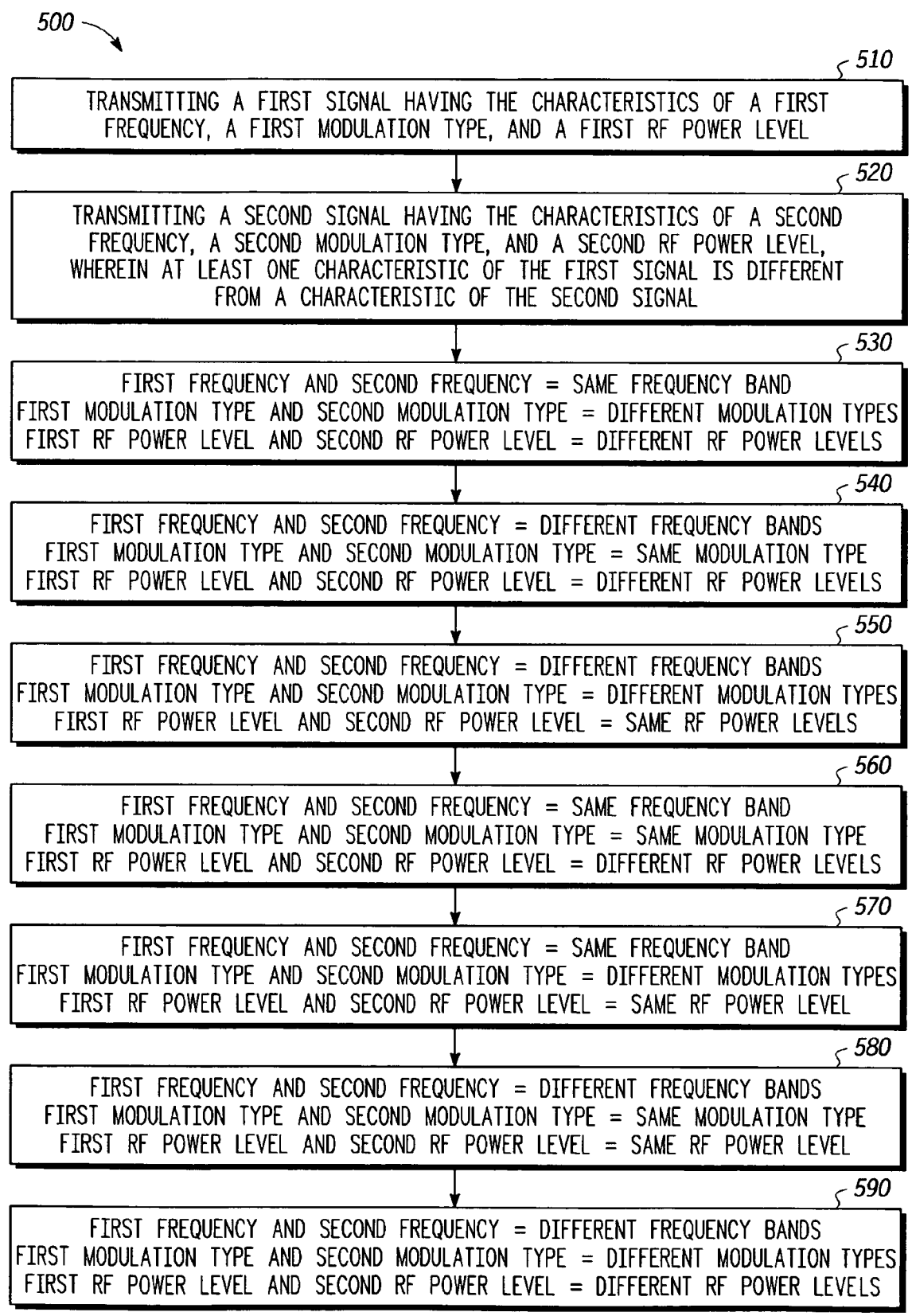
FIG. 5 is a flow diagram of one embodiment of a method of transmitting a plurality of signals utilizing a single PA line-up.

FIG. 5 is a flow diagram of one embodiment of a method 500 to transmit a plurality of communication signals with different characteristics from a single power amplifier line-up (e.g., low/high frequency PA line-up 210). Method 500, in one embodiment, initiates by low/high frequency PA line-up 210 transmitting a first signal including the characteristics of a first frequency, a first modulation type, and a first RF power level to an external device (e.g., a telecommunications basestation) (block 510). Moreover, method 500 includes low/high frequency PA line-up 210 transmitting a second signal including the characteristics of a second frequency, a second modulation type, and a second RF power level to the external device, wherein at least one characteristic of the first signal is different from a characteristic of the second signal (block 520).

In one embodiment, method 500 includes low/high frequency PA line-up 210 transmitting the first signal and the second signal with frequencies in the same frequency band (e.g., 824 MHz to 915 MHz, 1710 MHZ to 1910 MHz, and the like), but with different modulation types (e.g., GSM, EDGE, CDMA, or the like) and different RF power levels (e.g., 1 milliwatt to 3 Watts) (block 530). In another embodiment, method 500 includes low/high frequency PA line-up 210 transmitting the first signal and the second signal with the same signal modulation type (e.g., CDMA), but having frequencies in different frequency bands and with different RF power levels (block 540). In yet another embodiment, method 500 includes low/high frequency PA line-up 210 transmitting the first signal and the second signal with the same RF power level, but with frequencies in different frequency bands and with different modulation types (block 550).

Method 500, in one embodiment, includes low/high frequency PA line-up 210 transmitting the first signal and the second signal with frequencies in the same frequency band and with the same modulation type, but having different RF power levels (block 560). In another embodiment, method 500 includes low/high frequency PA line-up 210 transmitting the first signal and the second signal with frequencies in the same frequency band and with the same RF power level, but having different modulation types (block 570). In yet another embodiment, method 500 includes low/high frequency PA line-up 210 transmitting the first signal and the second signal with the same modulation type and the same RF power level, but having frequencies in different frequency bands (block 580). In still another embodiment, method 500 includes low/high frequency PA line-up 210 transmitting the first signal and the second signal with frequencies in different frequency bands, with different modulation types, and with different RF power levels (block 590).

In summary, various embodiments include an apparatus for matching signal impedance between a power amplifier line-up and an antenna. In one embodiment, the apparatus comprises a variable matching circuit comprising a first input, a first output, and at least a first variable capacitive element, wherein the first input is configured to receive signals from a power amplifier, the variable matching circuit is configured to selectively enable the first variable capacitive element to produce impedance-matched signals; and a variable harmonic filter comprising a second input, a second output, and at least a second variable capacitive element, wherein the second input is coupled to the first output and configured to receive the impedance-matched signals, the variable harmonic filter is configured to selectively enable the second variable capacitive element to filter out undesirable harmonics of the impedance-matched signals to produce filtered, impedance-matched signals, and the second output is configured to be coupled to the antenna.

In another embodiment, the variable matching circuit is configured to selectively enable the first variable capacitance element and the variable harmonic filter is configured to selectively enable the second variable capacitive element such that the filtered, impedance-matched signals include at least one of frequencies in a plurality of different frequency bands, a plurality of different modulation types, and a plurality of different RF power levels. In yet another embodiment, the variable matching circuit is configured to selectively enable the first variable capacitance element and the variable harmonic filter is configured to selectively enable the second variable capacitive element such that the filtered, impedance-matched signals include at least one of frequencies in a plurality of different frequency bands, and wherein a first frequency band is in the range of 824 MHz to 915 MHz, and a second frequency band is in the range of 1710 MHz to 1910 MHz.

The first variable capacitive element and/or the second variable capacitive element, in one embodiment, comprises at least one direct current (DC) terminal and at least one radio frequency (RF) terminal separate from the DC terminal. In another embodiment, the first variable capacitive element and/or the second variable capacitive element is a/are micro-electro-mechanical systems (MEMS) capacitive element(s). In yet another embodiment, the first variable capacitive element and/or the second variable capacitive element is a/are tunable MEMS capacitive element(s). In still another embodiment, the first variable capacitive element and/or the second variable capacitive element is a/are binary MEMS capacitive element(s).

Various other embodiments include a system for matching signal impedance between a power amplifier line-up and an antenna. In one embodiment, the system comprises a first matching circuit comprising a first input, a first output, and at least a first capacitive element, wherein the input is configured to be coupled to a signal generator and receive a signal from the signal generator, the first matching circuit is configured to impedance match the signal to produce a first impedance-matched signal; a driver comprising a second input and a second output, wherein the second input is coupled to the first output and configured to receive the first impedance-matched signal, the driver is configured to amplify the first impedance-matched signal to produce a first amplified, impedance-matched signal; a second matching circuit comprising a third input, a third output, and at least a second capacitive element, wherein the third input is coupled to the second output and configured to receive the first amplified, impedance-matched signal, the second matching circuit is configured to impedance match the first amplified, impedance-matched signal to produce a second impedance-matched signal; a power amplifier including a fourth input and a fourth output, wherein the fourth input is coupled to the third output and configured to receive the second impedance-matched signal, the power amplifier is configured to amplify the second impedance-matched signal to produce a second, amplified impedance-matched signal; a variable matching circuit comprising a fifth input, a fifth output, and at least a first variable capacitive element, wherein the fifth input is configured to receive signals from the fourth output, the variable matching circuit is configured to selectively enable the first variable capacitive element to produce a third impedance-matched signal; and a variable harmonic filter comprising a sixth input, a sixth output, and at least a second variable capacitive element, wherein the sixth input is coupled to the fifth output and configured to receive the third impedance-matched signal, the variable harmonic filter is configured to selectively enable the second variable capacitive element to filter out undesirable harmonics of the third impedance-matched signal to produce a filtered, third impedance-matched signal, and the sixth output is configured to be coupled to the antenna.

In another embodiment, the variable matching circuit is configured to selectively enable the first variable capacitance element and the variable harmonic filter is configured to selectively enable the second variable capacitive element such that the filtered, third impedance-matched signal includes at least one of frequencies in a plurality of different frequency bands, a plurality of different modulation types, and a plurality of different RF power levels. In yet another embodiment, the variable matching circuit is configured to selectively enable the first variable capacitance element and the variable harmonic filter is configured to selectively enable the second variable capacitive element such that the filtered, third impedance-matched signal includes at least one of frequencies in a plurality of different frequency bands, and wherein a first frequency band is in the range of 824 MHz to 915 MHz, and a second frequency band is in the range of 1710 MHz to 1910 MHz.

The first variable capacitive element and/or the second variable capacitive element, in one embodiment, comprises at least one direct current (DC) terminal and at least one radio frequency (RF) terminal separate from the DC terminal. In another embodiment, the first variable capacitive element and/or the second variable capacitive element is a/are micro-electro-mechanical systems (MEMS) capacitive element(s). In yet another embodiment, the first variable capacitive element and/or the second variable capacitive element is a/are tunable MEMS capacitive element(s). In still another embodiment, the first variable capacitive element and/or the second variable capacitive element is a/are binary MEMS capacitive element(s).

In another embodiment, the first matching circuit, the driver, the second matching circuit, the power amplifier, the variable matching circuit, and the variable harmonic filter form a single line-up. In yet another embodiment, the first matching circuit is a second variable matching circuit comprising at least a third variable capacitive element. In still another embodiment, the second matching circuit is a third variable matching circuit comprising at least a fourth variable capacitive element.

Furthermore, various other embodiments include a method to transmit a plurality of communication signals with different characteristics from a single power amplifier line-up to an antenna. In one embodiment, the method comprises transmitting a first signal including the characteristics of a first frequency, a first modulation type, and a first radio frequency (RF) power level to the external device, and transmitting a second signal including the characteristics of a second frequency, a second modulation type, and a second RF power level to the external device, wherein at least one characteristic of the first signal is different from at least one characteristic of the second signal. In another embodiment, at least two characteristics of the first signal are different from at least two characteristics of the second signal. In yet another embodiment, each of the characteristics of the first signal are different from each of the characteristics of the second signal.

While at least one embodiment has been presented in the foregoing detailed description, it should be appreciated that a vast number of variations exist. It should also be appreciated that the embodiment or embodiments are only examples, and are not intended to limit the scope, applicability, or configuration in any way. Rather, the foregoing detailed description will provide those skilled in the art with a convenient road map for implementing an embodiment of the invention, it being understood that various changes may be made in the function and arrangement of elements described in an embodiment without departing from the scope as set forth in the appended claims and their legal equivalents.

We claim:

1. An apparatus for matching signal impedance between a power amplifier line-up and an antenna, comprising:

a variable matching circuit having a first input, a first output, and at least a first variable capacitive element, wherein the first input is configured to receive signals from a power amplifier, the variable matching circuit is configured to selectively enable the first variable capacitive element to produce impedance-matched signals; and a variable harmonic filter having a second input, a second output, and at least a second variable capacitive element, wherein the second input is coupled to the first output and configured to receive the impedance-matched signals, the variable harmonic filter is configured to selectively enable the second variable capacitive element to filter out undesirable harmonics of the impedance-matched signals, and the second output is configured to be coupled to the antenna.

2. The apparatus of claim 1, wherein at least one of the first variable capacitive element and the second variable capacitive element comprises:

at least one direct current (DC) terminal; and at least one radio frequency (RF) terminal separate from the DC terminal.

3. The apparatus of claim 1, wherein the variable matching circuit is configured to selectively enable the first variable capacitance element and the variable harmonic filter is configured to selectively enable the second variable capacitive element such that the filtered, impedance-matched signal includes at least one of frequencies in a plurality of different frequency bands, a plurality of different modulation types, and a plurality of different RF power levels.

4. The apparatus of claim 3, wherein the variable matching circuit is configured to selectively enable the first variable capacitance element and the variable harmonic filter is configured to selectively enable the second variable capacitive element such that the filtered, impedance-matched signal includes at least one of frequencies in a plurality of different frequency bands, and wherein a first frequency band is in the range of 824 MHz to 915 MHz, and a second frequency band is in the range of 1710 MHz to 1910 MHz.

5. The apparatus of claim 1, wherein at least one of the first variable capacitive element and the second variable capacitive element is a micro-electro-mechanical systems (MEMS) capacitive element.

6. The apparatus of claim 5, wherein at least one of the first variable capacitive element and the second variable capacitive element is a tunable MEMS capacitive element.

7. The apparatus of claim 6, wherein at least one of the first variable capacitive element and the second variable capacitive element is a binary MEMS capacitive element.

8. A system for matching signal impedance between a power amplifier line-up and an antenna, comprising:
   a first matching circuit comprising a first input, a first output, and at least a first capacitive element, wherein the input is configured to be coupled to a signal generator and receive a signal from the signal generator, the first matching circuit is configured to impedance match the signal to produce a first impedance-matched signal;
   a driver comprising a second input and a second output, wherein the second input is coupled to the first output and configured to receive the first impedance-matched signal, the driver is configured to amplify the first impedance-matched signal to produce a first amplified, impedance-matched signal;
   a second matching circuit comprising a third input, a third output, and at least a second capacitive element, wherein the third input is coupled to the second output and configured to receive the first amplified, impedance-matched signal, the second matching circuit is configured to impedance match the first amplified, impedance-matched signal to produce a second impedance-matched signal;
   a power amplifier including a fourth input and a fourth output, wherein the fourth input is coupled to the third output and configured to receive the second impedance-matched signal, the power amplifier is configured to amplify the second impedance-matched signal to produce a second, amplified impedance-matched signal;
   a variable matching circuit comprising a fifth input, a fifth output, and at least a first variable capacitive element, wherein the fifth input is configured to receive signals from the fourth output, the variable matching circuit is configured to selectively enable the first variable capacitive element to produce a third impedance-matched signal; and
   a variable harmonic filter comprising a sixth input, a sixth output, and at least a second variable capacitive element, wherein the sixth input is coupled to the fifth output and configured to receive the third impedance-matched signal, the variable harmonic filter is configured to selectively enable the second variable capacitive element to filter out undesirable harmonics of the third impedance-matched signal to produce a filtered, third impedance-matched signal, and the sixth output is configured to be coupled to the antenna.

9. The system of claim 8, wherein at least one of the first variable capacitive element and the second variable capacitive element comprises:
   at least one direct current (DC) terminal; and
   at least one radio frequency (RF) terminal separate from the DC terminal.

10. The system of claim 8, wherein the variable matching circuit is configured to selectively enable the first variable capacitance element and the variable harmonic filter is configured to selectively enable the second variable capacitive element such that the filtered, third impedance-matched signal includes at least one of frequencies in a plurality of different frequency bands, a plurality of different modulation types, and a plurality of different RF power levels.

11. The apparatus of claim 10, wherein the variable matching circuit is configured to selectively enable the first variable capacitance element and the variable harmonic filter is configured to selectively enable the second variable capacitive element such that the filtered, third impedance-matched signal includes at least one of frequencies in a plurality of different frequency bands, and wherein a first frequency band is in the range of 824 MHz to 915 MHz, and a second frequency band is in the range of 1710 MHz to 1910 MHz.

12. The system of claim 8, wherein at least one of the first variable capacitive element and the second variable capacitive element is a micro-electro-mechanical systems (MEMS) capacitive element.

13. The system of claim 12, at least one of the first variable capacitive element and the second variable capacitive element is a tunable MEMS capacitive element.

14. The system of claim 13, wherein at least one of the first variable capacitive element and the second variable capacitive element is a binary MEMS capacitive element.

15. The system of claim 8, wherein the first matching circuit, the driver, the second matching circuit, the power amplifier, the variable matching circuit, and the variable harmonic filter form a single line-up.

16. The system of claim 8, wherein the first matching circuit is a second variable matching circuit comprising at least a third variable capacitive element.

17. The system of claim 16, wherein the second matching circuit is a third variable matching circuit comprising at least a fourth variable capacitive element.

18. A method for transmitting a plurality of communication signals with different characteristics from a single power amplifier line-up comprising a variable matching circuit including a variable capacitive element to an antenna, the method comprising:
   generating a plurality of signals including a low band frequency or a high band frequency;
   turning ON the variable capacitive element when a first signal includes the low band frequency;
   turning OFF the variable capacitive element when a second signal includes the high band frequency;
   transmitting the first signal from the single power amplifier line-up to the antenna; and
   transmitting the second signal from the single power amplifier line-up to the antenna.

19. The method of claim 18, wherein the low band frequency is in the range of 824 MHz to 915 MHz and the high band frequency is in the range of about 1710 MHz to 1910 MHz.

20. The method of claim 19, wherein the first signal and the second signal include different modulation types.

* * * * *